(12) United States Patent
Bartos et al.

(10) Patent No.: US 7,847,542 B2
(45) Date of Patent: Dec. 7, 2010

(54) MAGNETORESISTIVE SENSOR FOR DETERMINING AN ANGLE OR A POSITION

(75) Inventors: Axel Bartos, Waltrop (DE); Armin Meisenberg, Dortmund (DE); Fritz Dettmann, Braunfels-Philippstein (DE)

(73) Assignee: Meas Deutschland GmbH, Dortmund (DE)

( * ) Notice: Subject to any disclaimer, the term of this patent is extended or adjusted under 35 U.S.C. 154(b) by 976 days.

(21) Appl. No.: 10/547,431

(22) PCT Filed: Feb. 24, 2004

(86) PCT No.: PCT/EP2004/001791

§ 371 (c)(1),
(2), (4) Date: Oct. 4, 2006

(87) PCT Pub. No.: WO2004/074764

PCT Pub. Date: Sep. 2, 2004

(65) Prior Publication Data

US 2007/0080683 A1    Apr. 12, 2007

(30) Foreign Application Priority Data

Feb. 24, 2003  (DE) ............................... 103 08 030

(51) Int. Cl.
*G01R 33/12* (2006.01)
(52) U.S. Cl. .................................. 324/252; 324/207.21
(58) Field of Classification Search ................. 324/252, 324/207.21
See application file for complete search history.

(56) References Cited

U.S. PATENT DOCUMENTS

| | | | |
|---|---|---|---|
| 5,686,837 A | 11/1997 | Cohehoorn et al. | |
| 5,945,825 A | 8/1999 | Clemens | |
| 6,020,738 A | 2/2000 | Van Den Berg et al. | |
| 6,104,187 A | 8/2000 | Marx et al. | |
| 6,784,659 B2 * | 8/2004 | Haji-Sheikh et al. | ........ 324/174 |
| 2002/0006017 A1 | 1/2002 | Adelerhof | |

FOREIGN PATENT DOCUMENTS

| | | |
|---|---|---|
| DE | 35 14 457 A | 2/1987 |
| DE | 39 14 457 A1 | 11/1989 |
| DE | 42 02 680 A1 | 5/1993 |

(Continued)

*Primary Examiner*—Reena Aurora
(74) *Attorney, Agent, or Firm*—Howard IP Law Group, PC

(57) ABSTRACT

Magnetoresistive sensors which use the AMR or the GMR effect and indicate the direction of the homogeneous magnetic field of a rotatable permanent magnet in the angle measurement or the position of the sensor with respect to a scale, which is magnetized periodically in an alternating direction, for the position measurement, and in which the angle or position value is obtained from the quotient of the output signals from two bridges or half bridges with the aid of arctan interpolation, allow small measurement errors if the output signals have small harmonic components and hysteresis areas. In arrangements according to the invention, this is achieved by the resistors being composed of strips and by continuously varying the resistance-determining angle along the strip longitudinal extent for each constant magnetic field acting on the strips. The resistance-determining angle is between the current and magnetization direction for AMR sensors and is between the magnetization directions of two layer components for GMR sensors.

32 Claims, 5 Drawing Sheets

FOREIGN PATENT DOCUMENTS

| | | |
|---|---|---|
| DE | 196 49 265 A | 6/1998 |
| DE | 196 52 562 C | 6/1998 |
| DE | 197 01 137 A1 | 7/1998 |
| DE | 197 43 335 C | 11/1998 |
| DE | 198 39 450 A | 3/2000 |
| DE | 199 49 714 A | 4/2001 |
| DE | 101 13 131 A | 9/2002 |
| DE | 101 27 754 A | 1/2003 |
| DE | 101 30 620 A | 1/2003 |
| EP | 0 730 162 A | 9/1996 |
| EP | 0 863 406 A | 9/1998 |
| WO | WO 02/06845 | 1/2002 |

\* cited by examiner

MAGNETORESISTIVE SENSOR FOR DETERMINING AN ANGLE OR A POSITION

BACKGROUND OF THE INVENTION

The invention relates to magnetoresistive sensors for determining angles which a rotatable magnet assumes with respect to the sensor, or of positions with the sensor being opposite a magnetic scale and having a periodic magnetic pattern. Such angle and position measurement arrangements are used in large numbers, for example in machine construction, in motor vehicle engineering and in precision mechanics.

Magnetoresistive sensors for determination of angles or positions are known. The document WO 02/06845 A1 provides a summary of the prior art relating to analog determination of angles by means of magnetoresistive sensors on the basis of the anisotropic magnetoresistive (AMR) effect, the gigantic magnetoresistive (GMR) effect and the tunnel effect between magnetoresistive layers (TMR). In the case of the AMR effect, the resistance of a layer strip is governed by the angle $\alpha$ between the current direction and the direction of magnetization. This can be defined by the relationship $R(\alpha) = R_0 + (\Delta R/2)(1 - \cos(2\alpha))$. As can be seen from this, the resistance change passes through one complete period after a change in the angle $\alpha$ through 180°. If the direction of magnetization matches the direction of the field, acting on the layer strip, of a permanent magnet which is mounted such that it can rotate in the vicinity, then two complete period cycles of the resistance change are produced for one complete revolution of the permanent magnet. This can be measured as a voltage change when current flows through the layer strip.

In the case of the GMR effect and TMR effect, the resistance of a layer strip or of a tunnel transition is dependent on the angle $\beta$ between the directions of the magnetization of two layers or layer components of magnetoresistive material. If the magnetization direction in the one layer component is fixed by means of a natural or artificial antiferromagnet which is in direct contact and only the magnetization direction of the second component follows the applied field of the permanent magnet which can rotate, then the resistance change is defined by the relationship $R(\beta) = R_0 + (\Delta R/2)(1 - \cos(\beta))$. In this case, this results in only one full period of the resistance change for one revolution of the permanent magnet, or of the voltage, which can be used as a signal, on the layer strip or tunnel junction.

In accordance with the stated formulae, this results in ideal conversion of an angle to a cosine function. In practice, however, it has been found that this conversion cannot be carried out without errors. Harmonics of the respective fundamental occur in the signals and their period lengths are an integer fraction of the 180° or 360° mentioned above. The reason for the errors is that the assumed match between the direction of the magnetization of the layers and the direction of the applied magnetic field is not sufficiently accurate. In the case of AMR angle sensors, the match between the stated directions can be improved by high permanent magnetic field strengths. However, this can be achieved only by using expensive high-coercivity permanent magnet materials, or by mechanically complex fitting of the permanent magnet in the very immediate proximity of the sensor. In the case of GMR or TMR sensors, the use of ever higher magnetic strengths does not lead to an improvement in the sinusoid nature of the signal, since these field strengths result in rotation of the magnetization of the magnetoresistive layer which is coupled to the antiferromagnet.

There are two possible reasons for the discrepancy in the direction of the magnetization of the free and AMR layer strips from the direction of the applied magnetic field. The first is fundamentally of a physical nature and has already been mentioned in Laid-Open Specification DE 198 39 450 A1 with the equation which the angle $\phi$ between the direction of the magnetization and the strip longitudinal direction must satisfy, and which is given by $$H_x/H_0 \tan(\phi) + \sin(\phi) - H_y/H_0 = 0.$$

$H_x$ is in this case the magnetic field component in the strip longitudinal direction, and $H_y$ is the component at right angles to this. The match between the angle $\phi$ and the angle $\alpha$ stated above for which the equation $$\tan(\alpha) = H_y/H_x$$

applies is achieved only in the situation in which $H_x/H_0$ and $H_y/H_0$ assume very large values, which corresponds to the stated condition of the need to use high field strengths. The second reason is that, in limited angle ranges and with relatively weak fields from the permanent magnet, the magnetization direction is split into domains, particular at strip ends and edges, and this leads to resistances which differ from the ideal behavior and to hysteresis in the angle ranges.

The two cited documents WO 02/06845 A1 and DE 198 39 450 A1 have specified arrangements of layer strips, which each form magnetoresistive resistors, in order to improve the measurement accuracy which can be achieved by means of magnetoresistive angle sensors, and these arrangements are suitable for filtering out the harmonics from the output signals from the sensors. This filtering is also effective at relatively low magnetic field strengths. This is achieved in that, in the case of AMR sensors, two or more groups of parallel straight strips with precisely defined angles between the longitudinal directions of the strips are used instead of long straight magnetoresistive strips whose longitudinal directions are parallel to one another in sensors without harmonic filtering. The greater the number of groups of strips that are used, the higher is the order of harmonics up to which the harmonics are filtered out of the signal. However, one disadvantage is that each new group of strips with a new fixed inclination angle with respect to the already existing strips also results in new angle ranges of the applied magnetic field, whose angle must be measured, and in which splitting into domains and thus hysteresis occurs. This applies in particular to field strengths which are not very much greater than the anisotropic field strength of the strips.

It is admittedly normally possible to use parallel long magnetoresistive strips in the case of GMR and TMR sensors. However, the directions of the magnetization of the layers which are coupled to the respective antiferromagnet in the various groups of strips must form precisely defined angles between them. It is thus fundamentally impossible to avoid magnetization components which are aligned at right angles to the strip longitudinal direction, and, in this case as well, this results in the formation of a number of angle ranges, which increases with the number of groups of strips, in which hysteresis occurs, particularly in the case of the relatively weak field strengths which can be produced economically.

Magnetoresistive sensors for determination of positions, which are arranged close to the surface of magnetic scales such that they can move in the measurement direction, determine the respective position value from the angle which the magnetic field forms with a strip direction at the location of the sensor. If the magnetic scale is composed of a permanent magnet material which is magnetized periodically in alternate directions, then this angle varies approximately linearly with progress in the measurement direction. The problems which have to be solved in order to achieve high measurement accuracies correspond essentially to those in the case of angle sensors. This applies primarily to use for filtering of harmonics.

SUMMARY OF THE INVENTION

In accordance with the invention position and angle sensors magnetoresistive effects are provided whose measurement accuracy is increased by filtering out harmonic components from the signals without producing hysteresis, which would corrupt the measured values, in relatively weak magnetic field strengths.

In accordance with the invention, sensor resistors are formed without sudden changes in the resistance-determining angle in the magnetoresistive strips from which the sensor resistors are formed. When the AMR effect is being used, the angle between the current direction and the direction of the magnetization is the resistance-determining angle. In order to achieve harmonic filtering in the magnetoresistive resistors, different resistance-determining angles are required in the strips. These can be achieved without any sudden change in the resistance-determining angle by the shape of the edges of the strips. If, by way of example, both strip edges can be represented as parallel running sinusoidal curves, then the current direction in the strips will be matched to this shape, and the angle of the current direction with respect to the longitudinal direction of the strip, which is formed by the straight-line connection between its end points, likewise runs in the form of a sine function. The direction of the magnetization of the magnetoresistive material of the strips when the magnetic field strengths are relatively weak is governed by the field strength of the magnetic field applied to the strips, by the crystal anisotropy field strength of the material, and by the shape anisotropy field strength. The crystal anisotropy of the material has the same strength and direction in all places in the area of the sensor chip. The shape anisotropy likewise runs parallel to the edge in the quoted example. The direction of the magnetization along the strip thus also changes only continuously. There are therefore no sudden changes in the direction of the magnetization, and this avoids one reason for the splitting into domains.

In addition to the configuration of the strip edge, there is a second possible way to change the direction of the current in strips composed of AMR material. This is to use the barber's pole structure, which has already been described in Laid-Open Specification DE 35 14 457, but without any reference to harmonic filtering for angle and length measurement. In the case of the barber's pole structure, there are a large number of conductive layer strips on the strips of magnetoresistive material, at a distance which is of the same order of magnitude as the width of the magnetoresistive strips, with the longitudinal directions of the conductive layer strips forming intermediate angles with those of the magnetoresistive strips. Owing to the comparatively high conductivity of the conductive layer strips, the current direction is approximately at right angles to their longitudinal direction. Different current directions can thus be set in magnetoresistive strips with straight and parallel edges by choosing different intermediate angles, so that the required different resistance-determining angles can be achieved with the same magnetization direction. There is therefore no need for a relatively large number of magnetoresistive strips inclined at different angles to one another, and this precludes any increase in the occurrence of areas subject to hysteresis in the angle measurement.

In the case of the GMR effect, layer systems whose first component has a magnetization whose direction can essentially follow the magnetic field of a magnet which can be rotated with respect to the sensor and in which the magnetization of the second component remains essentially independent of the direction of the magnetic field acting there by coupling to a further magnetic component are particularly suitable for angle measurement. The resistance-determining angle is that between the directions of the magnetizations of the first and of the second component. Different resistance-determining angles are required for harmonic filtering. According to the invention, this is achieved in that the direction of the magnetization of the second component is varied continuously along the longitudinal direction of the magnetoresistive strips. Such continuous variation is achieved, for example, in such a way that the opposite strip edges can be represented by identical continuously varying functions, such that the further component is an antiferromagnet to whose axial direction the magnetization of the second component is coupled, and such that the axial direction is adjusted by means of the magnetic field of a current through the magnetoresistive strips. In consequence, the direction of the magnetization of the second component is always at right angles to the edge, and changes continuously in the longitudinal direction of the strips. The continuous variation in the direction of the magnetization of the second component avoids the formation of domains both in the second component and (owing to unavoidably weaker coupling between the first component and the second component) in the first component, and thus increased occurrence of hysteresis areas. The magnetization direction of the second component can advantageously be adjusted by the use of a constant magnetic field in conjunction with the field of a current through the strips. It is thus possible to produce different continuous functions for the profile of the resistance-determining angle along the longitudinal direction.

Specific functions for the profile of the edges of the magnetoresistive strips are specified in the dependent claims, for the use of both AMR sensors and GMR sensors. The choice of the optimum relationship between the period length and the amplitude of the periodic edge functions is advantageously made as a result of a calculation which assesses harmonic components and the amplitude of the signals.

BRIEF DESCRIPTION OF THE DRAWINGS

The invention will be explained further with reference to exemplary embodiments. The following drawings are attached.

DETAILED DESCRIPTION OF PREFERRED EMBODIMENTS

Figure 1:
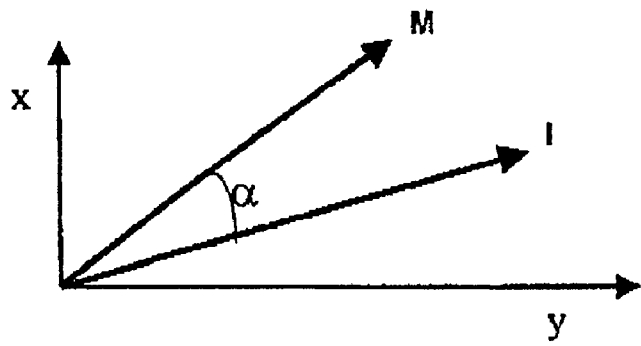
FIG. 1: shows resistance-determining angles for the AMR effect.

FIG. 1 illustrates the x-y layer plane of an AMR strip. The strip longitudinal direction is intended to coincide with the x axis in this case. The direction of the current I for a point on the strip is shown. In general, this direction does not match the strip longitudinal direction x. Under the influence of an external magnetic field, the magnetization M at the point under consideration points in the direction shown. The angle between the direction of the current I and the direction of the magnetization M is $\alpha$. The resistivity $\rho_a$ of the magnetoresistive layer is governed by this angle:

$$\rho_a(\alpha)=\rho_{a0}+(\Delta\rho_a/2)(1-\cos(2\alpha))$$

where $\rho_{a0}$ is the non-field-dependent component and $\Delta\rho_a$ is the amplitude of the field-dependent change in the resistivity. The resistance-determining angle at any point on the strip is $\alpha$. The resistivity is likewise a function of x when the direction of the current I and of the magnetization M varies in the strip longitudinal direction x.

Figure 2:
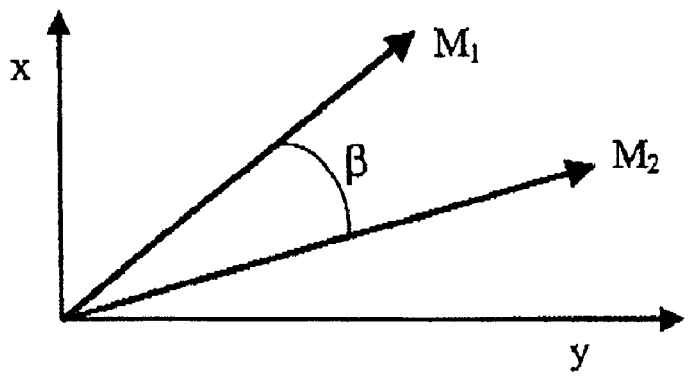
FIG. 2: shows resistance-determining angles for the GMR effect.

FIG. 2 shows a GMR layer system at a point on the x-y layer plane. The longitudinal direction of a strip formed from the layer system is intended to match the x axis. The GMR layer system contains two components, whose magnetizations $M_1$ and $M_2$ can be set in different directions independently of one another. $M_1$ is in this case the magnetization of the first component, whose direction essentially matches that of the applied external magnetic field, at the point under consideration. $M_2$ is the magnetization of the second component, which in this case is essentially coupled to the alignment of a third antiferromagnetic component. The angle between the directions of the magnetizations $M_1$ and $M_2$ is $\beta$. The resistivity $\rho_g$ of the GMR layer at the point under consideration is given by:

$$\rho_g(\beta)=\rho_{g0}+(\Delta\rho_g/2)(1-\cos(\beta)).$$

where $\beta$ is the resistance-determining angle at any point on the strip. The resistivity is likewise a function of x when the direction of the magnetization $M_1$ and of the magnetization $M_2$ vary in the strip longitudinal direction x.

Figure 3:
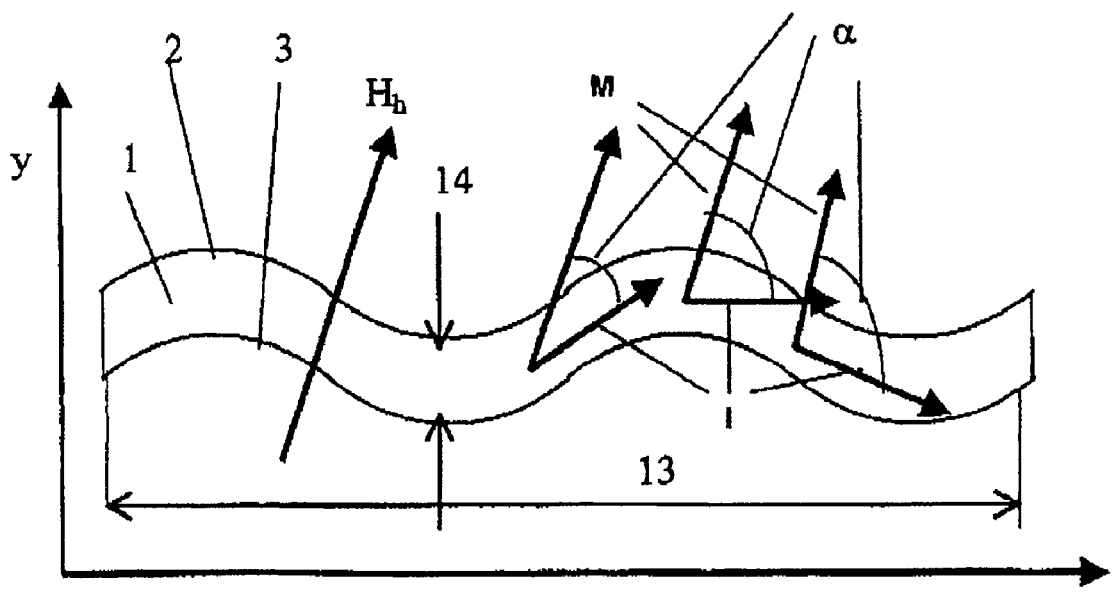
FIG. 3: shows the current direction set by the strip edges for AMR sensors.

FIG. 3 shows an AMR strip 1 whose longitudinal extent extends in the x direction. The AMR strip 1 is bounded by a first edge 2 and a second edge 3. In general, it is possible to represent the edges 2 and 3, in accordance with the invention, by any desired functions which vary continuously in the x direction. In the illustrated case, both edges 2; 3 run parallel and are sinusoidal. The period length 13 of the sine function is considerably greater than the width 14 of the AMR strip 1. The current I in the AMR strip thus flows parallel everywhere to the edges 2; 3, and its direction varies continuously as x progresses. A homogeneous magnetic field $H_h$ acts on the plane of the AMR strip 1 with a field strength which is greater than the anisotropy field strength of the AMR strip 1. The direction of the magnetization M at any point on the AMR strip 1 is thus given essentially by the direction of the homogeneous magnetic field $H_h$, and the resistance-determining angle $\alpha$ likewise varies continuously with progress in the x direction. When using AMR strips 1 for angle, position or length determination, the homogeneous magnetic field $H_h$ that is shown rotates on the x-y plane. The resistance of the AMR strip 1 as a function of the angle which the homogeneous magnetic field $H_h$ forms with the x axis in this case has a minimal proportion of harmonics. For this purpose, the angle range which the current direction includes with the x axis should include values between 0° and at least 15°. The upper limit for the magnitude of the greater angle between the current and the x direction is 45°.

The stated values for this angle should also be complied with for situations in which the edges of the AMR strips cannot be represented by sinusoidal curves. The edges 2; 3 can advantageously be formed by curves in the form of circular arcs or by sums of second and fourth order parabolic curves.

Figure 4:
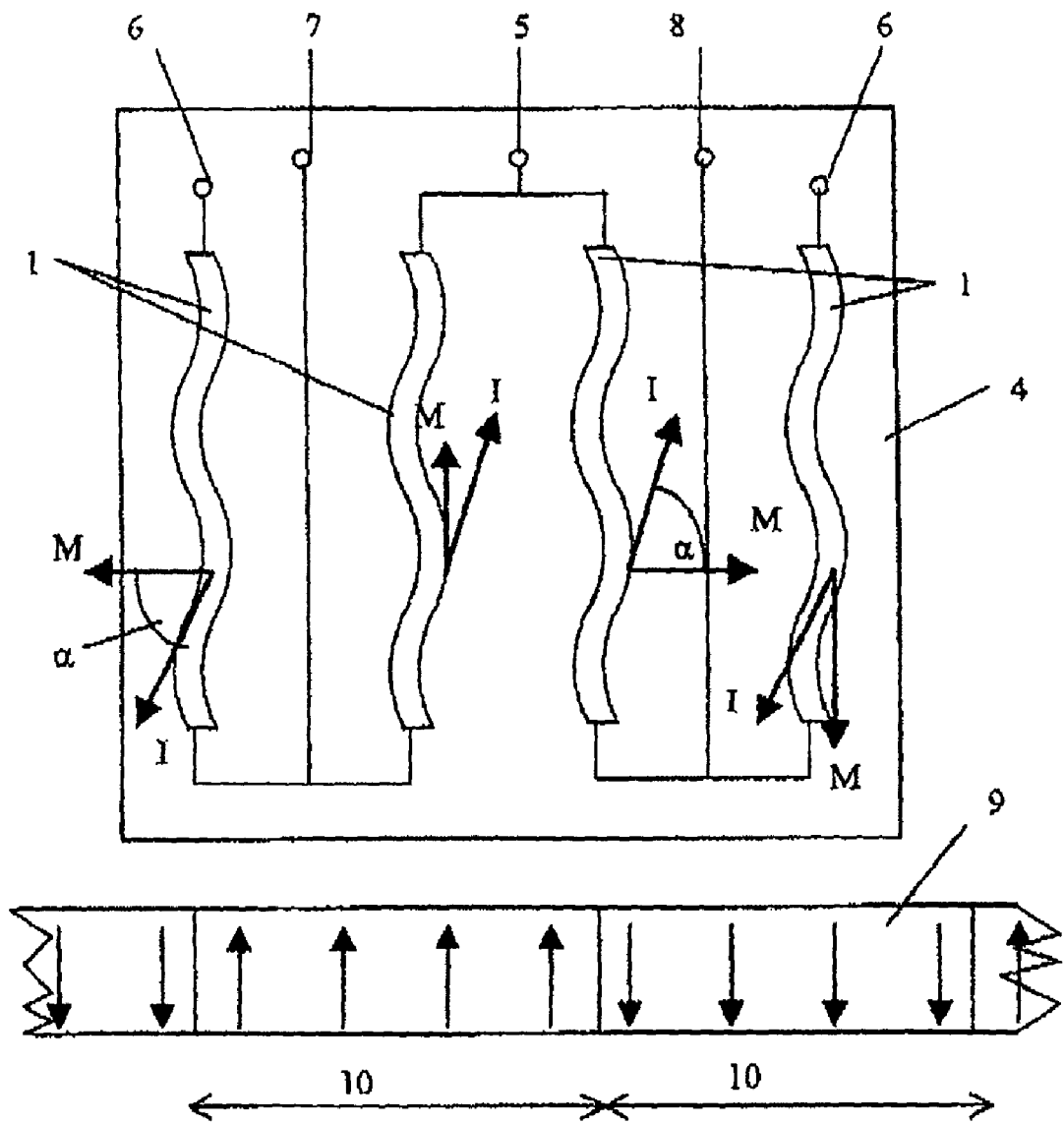
FIG. 4: shows an AMR length sensor bridge according to the invention.

A sensor bridge formed on the basis of the AMR strip 1 shown in FIG. 3 on a chip surface 4 for determination of the position with respect to a scale 9 is illustrated in FIG. 4. The scale 9 is illustrated in the form of a section, and the plane of the chip surface 4 matches the section surface. The scale 9 is magnetized periodically upwards and downwards, alternately on the section surface, with constant pole lengths 10. The size relationships in the drawing are not to scale. For example, the strip widths have been illustrated enlarged. Two AMR strips 1 in each case form one branch of the Wheatstone bridge. The AMR strips 1 are electrically connected to one another via non-magnetic conductive layer strips. The positive pole of the operating voltage of the bridge is connected to the connecting contacts 6, and the negative pole is connected to the connecting contact 5. The output voltage of the bridge can be tapped off at the output contacts 7 and 8. As can be seen from FIG. 4, the AMR strips 1 are arranged at a distance of half the pole length 10 alongside one another. The directions of the current I and of the magnetization M, as they occur under the influence of the magnetic field of the magnetic scale 9 in the illustrated position, are in each case indicated at a point which is at an equal distance from the lower strip end for all of the AMR strips. The suppression of harmonic components as a function of the resistances of the AMR strips 1 from that position means that the output signal from the bridge is a voltage which varies periodically with the position, with the period length corresponding to the pole length 10. This voltage can essentially be represented by a simple sinusoidal function.

A complete position sensor contains two of the illustrated Wheatstone bridges which are offset with respect to one another through (n+¼) times the poll length 10, where n is an integer (n=0; 1; 2; 3; . . . ). The position is determined in a known manner from the number of pole lengths 10 which have already been traveled over and the fraction which results from the quotient of the two bridge signals by the use of arctan interpolation. Because of the suppression of the harmonic component in the bridge signals, the position indication error is small.

In order to increase the resistance of the bridges for the position sensor and in order to make better use of the chip area 4, a greater number of identically designed AMR strips can be arranged parallel and connected in a meandering shape, instead of each individual AMR strip 1.

Figure 5:
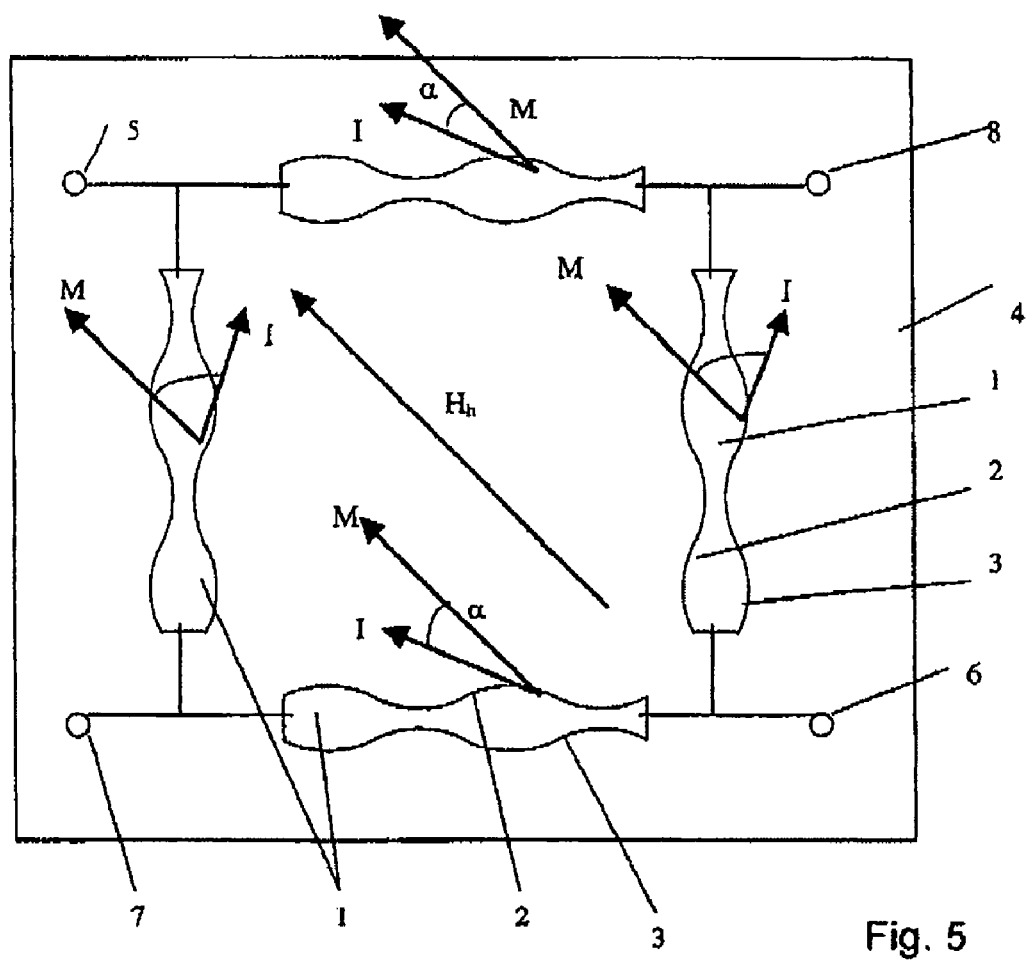
FIG. 5: shows an AMR angle sensor bridge according to the invention.

As another embodiment of the invention, FIG. 5 shows a bridge arrangement on a chip surface 4 which is part of an angle sensor. The use of the connecting contacts 5; 6 and of the output contacts 7; 8 corresponds to that shown in FIG. 4. The AMR strips 1 are in this case bounded by edges 2; 3, which originates from one another by mirror-imaging. The current direction matches its direction only directly on the longitudinal axis of the AMR strips 1. However, it will run increasingly parallel to the direction of the edge 2; 3 the closer the point under consideration is to the respective edge 2 or 3. Thus, in this case as well, the current direction changes continuously in the longitudinal direction of the AMR strips 1. If the direction of the magnetization of the AMR strips 1 is essentially the same in a homogeneous magnetic field $H_h$, then the resistance-determining angle α is likewise subject to a continuous change. Different The resistance-determining angles α are a precondition for harmonic filtering in the AMR strips 1. The continuous change of these angles prevents the occurrence of hysteresis. The resistance-determining angles α are shown in FIG. 5 at points which are at equal distances from the end of the AMR strips and from the longitudinal axis thereof. The longitudinal directions of the two AMR strips 1 which each form one bridge arm are at right angles to one another. The resistance changes in opposite sensors in the AMR strips 1 in each bridge arm during rotation of the homogeneous magnetic field $H_h$ whose direction is intended to be determined by the angle sensor is thus ensured. When the homogeneous magnetic field $H_h$ is rotated through 180°, the sinusoidal output voltage produced as the output signal changes through one entire period. In addition to the illustrated bridge, the complete angle sensor also contains an identical bridge which is rotated through 45° with respect to that illustrated. The angle value is determined from the quotient of the output signals from the two bridges using the known arctan interpolation process.

A greater number of identical AMR strips can be arranged parallel and can be connected in a meandering shape, instead of each individual AMR strip 1, in order to increase the resistance of the bridges in the angle sensor, and in order to make better use of the chip area 4.

Figure 6:
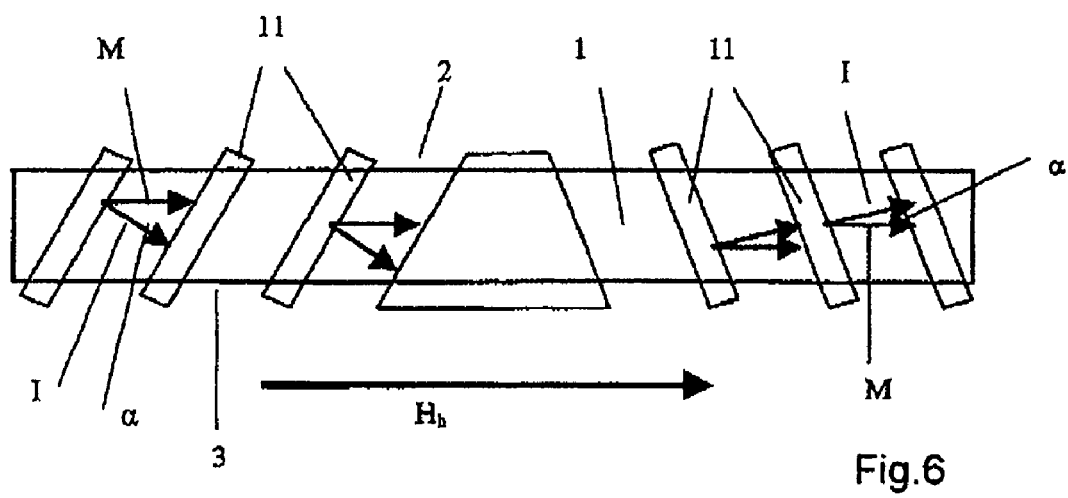
FIG. 6: shows a current direction set by means of a barber's pole structure for AMR sensors.

FIG. 6 illustrates a further implementation option for different current directions in AMR strips 1. The AMR strip 1 has straight and parallel edges 2; 3. Conductive layer strips 11, which are inclined with respect to the longitudinal direction, are arranged on the AMR strip 1. Their conductivity is several orders of magnitude higher than that of the AMR layer. The current therefore flows on the shortest route from one conductive layer strip 11 to the next, and the current direction is at right angles to the longitudinal direction of the conductive layer strips 11. The direction of the current I may be adjusted in this way by the inclination of the conductive layer strips 11. FIG. 6 shows only two different current directions. However, it is clear that a continuous change in the current direction can be achieved by variation of the inclination angle of each subsequent conductive layer strip 11 with respect to its predecessor. The length of an AMR strip is frequently about 1000 times greater than the width. The distance between the conductive layer strips should be of the same order of magnitude as this width. With the large number of conductive layer strips 11 which are thus required, the change in the inclination angle which is required from one conductive layer strip 11 to the next is sufficiently small that continuous variation can be assumed. The magnetization then also points in this direction. The resultant resistance-determining angles α for the two inclination angles of the conductive layer strips are shown.

Figure 7:
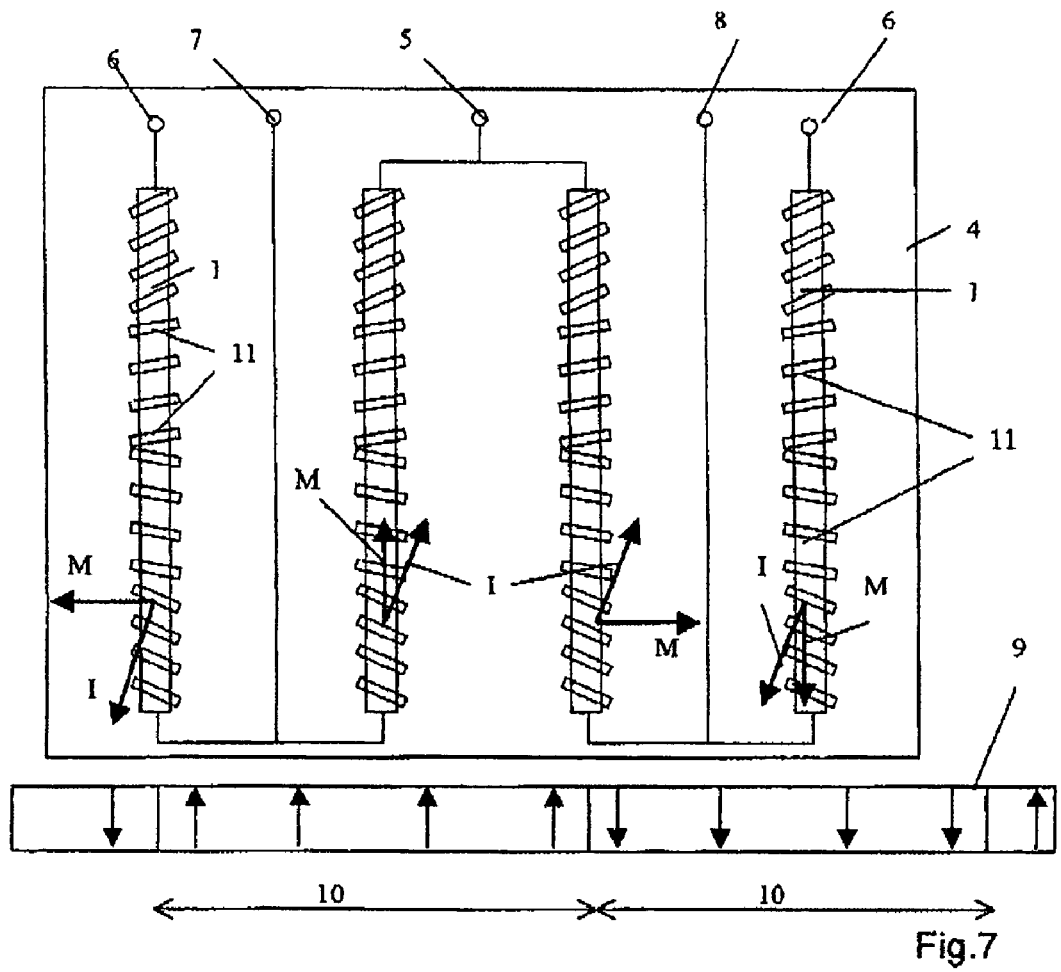
FIG. 7: shows an AMR length sensor according to the invention with a barber's pole structure.

FIG. 7 shows a Wheatstone bridge on a chip surface 4 which is formed from four identical AMR strips 1 with conductive layer strips 11, and is used for position measurement. The chip surface 4 is vertically above the surface of the scale 9 whose section surface is illustrated in the drawing. The scale 9 is magnetized in alternate directions in pole lengths 10 of equal length. The position of the AMR strips 1 and their connection and circuitry correspond to those described in FIG. 4. In the specific illustrated case, the conductive layer strips 11 are applied to the AMR strips 1 such that the current I flows in the same direction in each case four length elements, of equal length, of the AMR strips 11. The angles which the current directions form with the longitudinal direction of the AMR strips 1 are ±6° and ±24°. The third and fifth order harmonics have thus been eliminated from the position dependency of the resistances of the AMR strips 1. Even-order harmonics are cancelled out by subtraction in the bridge. All the harmonics up to the seventh order are thus removed from the bridge output signal. In this case as well, two bridges which are offset through (1+¼) times the pole length 10 are once again required for the complete position sensor. In this case as well, each AMR strip 1 may be replaced by a plurality of parallel, identical AMR strips connected in a meandering shape, in order to increase the bridge resistance.

In contrast to the situation illustrated in FIG. 7, the angle of the current direction with respect to the longitudinal direction of the AMR strips 1 can also be varied continuously from one distance between the conductive layer strips 11 to the next. Optimum matching to the required measurement accuracy for the position value is possible by calculation of the bridge output signals.

According to the invention, angle sensors can also be formed from AMR strips 1 with conductive layer strips 11 arranged on them. In this case, by suitable choice of the angles between the longitudinal direction of the conductive layer strips 11 and the longitudinal direction of the AMR strips, it is possible for the longitudinal directions of the AMR strips 1 in both resistors in one bridge arm to be aligned parallel to one another or to be inclined at 90° to one another, or to include any angle value between 0° and 90° between them.

In all magnetoresistive sensor arrangements with harmonic filtering, it is impossible to avoid a reduction in the amplitude of the output signal as a function of the angle or of the position, in comparison to those without such harmonic filtering. In the case of the AMR strips 1 with conductive layer strips 11, this reduction has the least value. This is because, in this case, averaging need be carried out only over different current angles in each resistance in the strips, and not also over different angles of the magnetization in the respective AMR strips 1. The magnetization direction in the straight AMR strips is the same everywhere.

Figure 8:
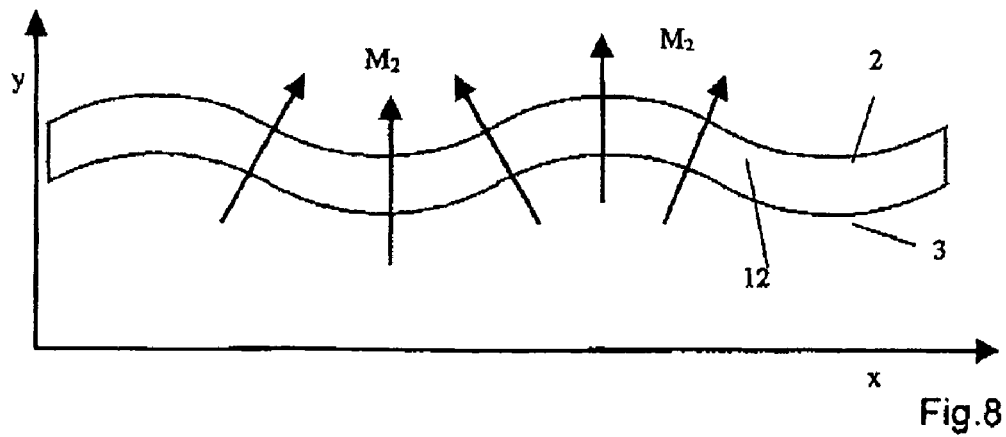
FIG. 8: shows a continuously varying profile of the field-independent magnetization direction for GMR sensors.
Figure 9:
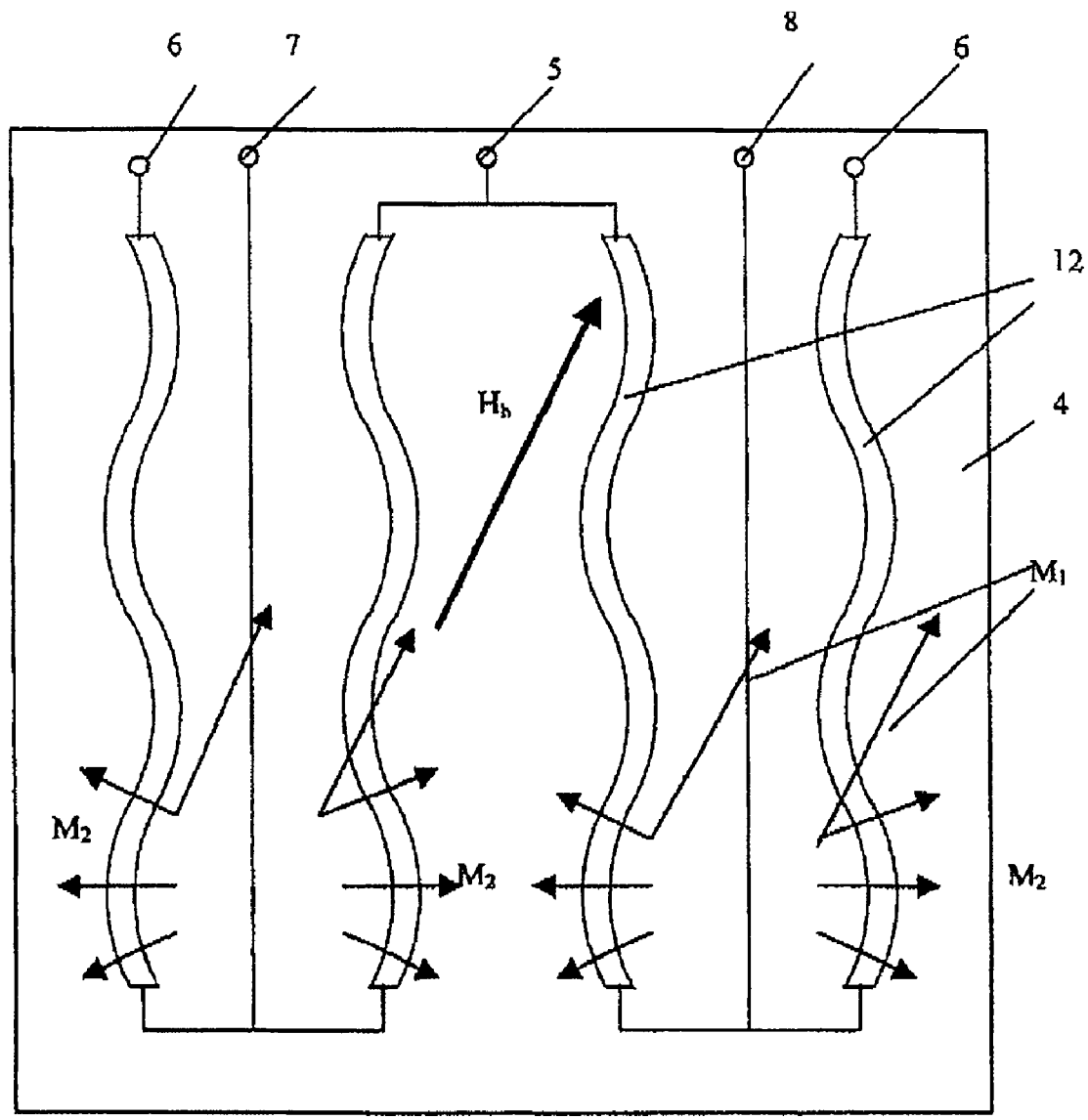
FIG. 9: shows a GMR angle sensor bridge according to the invention.

The use of the invention for GMR sensors is explained using a further example in FIG. 8 and FIG. 9. FIG. 8 shows a GMR strip 12 whose layer plane is defined on the x-y plane and whose longitudinal direction matches the x direction. The direction of the magnetization $M_1$ (FIG. 2) of the first component of the GMR layer, which essentially follows the direction of the external magnetic field, is not shown here. The GMR strip 12 is bounded by the edges 2 and 3. The edges 2; 3 can be represented in the drawing by identical sinusoidal curves, and run parallel for each x value. As can be seen from the drawing, the direction of the magnetization $M_2$ of the second component of the GMR layer is at right angles to the edges 2; 3 in all cases. This distribution of the magnetization $M_2$ is the result of the field of a current through the GMR strip which was fed in at a time at which the GMR strip 12 was cooling down from a higher temperature to below its Neel temperature. The details of this magnetization setting process are known and are not the subject matter of the present invention. The continuous variation of the magnetization $M_2$ as the x value progresses results in continuous variation of the resistance-determining angle β when an external field is applied and the direction of the magnetization $M_1$ of the first component is thus essentially constant (FIG. 2).

FIG. 9 shows an angle sensor bridge which is formed from GMR strips as shown in FIG. 8. Four GMR strips 12 are located on a chip surface 4 and have been supplemented by conductive, non-magnetic connections and connecting contacts corresponding to the description relating to FIG. 4 to form a Wheatstone bridge. The chip surface 4 is subject to a homogeneous magnetic field $H_h$ whose direction can rotate on the plane of the chip surface 4 and whose angle with respect to the lower edge of the chip surface 4 is intended to be determined. The longitudinal directions of the four GMR strips 12 are parallel, and the two GMR strips in each bridge arm originate from one another by mirror-imaging. This also applies to the directions of the magnetization $M_2$ of the second component of the GMR layer. This ensures that the resistance of the resistors in each bridge arm changes in opposite senses during rotation of the magnetic field $H_h$. The magnetization of the first component of the GMR layer $M_1$ essentially points in the direction of the magnetic field $H_h$. The resistance-determining angle β thus varies continuously along each GMR strip 12 for any applied magnetic field $H_h$, thus making it more difficult for hysteresis areas to form. The use of different resistance-determining angles in each bridge resistor results in harmonic filtering. In order to achieve a level of suppression of the harmonic component that is significant in practice, the magnitude of the maximum gradient angle of the edge curves should be chosen to be in the range between 30° and 90°. The choice of the optimum relationship between the period length and the maximum gradient angle of the edge curves is made by calculation of the bridge output signal.

In this case as well, the complete angle sensor contains a second bridge of identical design, but which is arranged rotated through 90° with respect to that shown. The angle value to be determined is obtained from the quotient of the two bridge signals by use of the arctan interpolation process.

The edges 2; 3 of the GMR strips can be reproduced by different curves with a continuous profile. Curve sections in the form of circular arcs or sums of second and fourth order parabolae are advantageous.

The values of the resistances in the bridge can be increased by using parallel GMR strips, which are identical to one another, with a meandering connection instead of each individual GMR strip 12.

The direction of the magnetization $M_2$ of the second component of the GMR layer is advantageously aligned by combination of fields from currents through the GMR strips and from externally applied magnetic fields while the GMR strips 12 are being cooled down below the Neel temperature.

The configuration of position sensors based on GMR strips 12 is not shown in detail here, but is part of the present invention and can easily be derived from the exemplary embodiments described.

List of Reference Symbols

1 AMR strip
2 First edge
3 Second edge
4 Chip surface
5 Operating voltage contact
6 Operating voltage contact
7 Bridge output voltage contact
8 Bridge output voltage contact
9 Scale
10 Pole length of the scale
11 Conductive layer strip
12 GMR strip
13 Period length of the edge curve
14 Width of the strip
α Resistance-determining angle
β Resistance-determining angle
$H_h$ Homogeneous magnetic field
M Magnetization of the AMR layer
$M_1$ Magnetization of the first component of the GMR layer
$M_2$ Magnetization of the second component of the GMR layer
I Current
x,y Coordinates of the layer plane

What is claimed is:

1. A magnetoresistive sensor for determining an alignment of said sensor relative to a magnetic field, said magnetic field being movable with respect to said sensor and periodic in a direction of movement, said sensor comprising:
at least two bridges comprising resistors formed of strips of a magnetoresistive material, with each strip being shaped such that a direction of a current flowing through each strip varies continuously along a longitudinal extent of the strip, with the resistance value of each strip being determined by a resistance-determining angle between the direction of the current and the direction of magnetization at locations along the longitudinal extent of each strip.

2. The magnetoresistive sensor of claim 1, wherein at each of the ends of a strip the direction of the current forms angles of identical size with a longitudinal direction of the strip.

3. The magnetoresistive sensor of claim 2, wherein the direction of the current with respect to the center of the longitudinal direction of said strip varies symmetrically along the longitudinal extent of said strip.

4. The magnetoresistive sensor of claim 1, wherein the direction of the current with respect to the center of the longitudinal direction of said strip varies periodically along the longitudinal extent of a strip.

5. The magnetoresistive sensor of claim 1, wherein all resistors of the bridges are formed by strips that are parallel to one another and have the same shape, the longitudinal direction of said strips extending at right angles to the direction of movement of said periodic magnetic field.

6. The magnetoresistive sensor of claim 1, wherein said strips are parallel to one another and have the same shape, the longitudinal direction of said strips diverging by rotation through given offset angles.

7. The magnetoresistive sensor of claim 6, wherein the bridges comprise at least two full or half bridges, said strips comprising a material having an AMR effect such that an offset angle inside each half bridge is 90°, and an offset angle between corresponding resistors in two half or full bridges is 45°.

8. The magnetoresistive sensor of claim 1, wherein each strip has at least one edge extending along the longitudinal extent of said strip, the shape of said edge having a continuously variable function, such that at least close to said edge, the current direction in said strips is parallel to said edge.

9. The magnetoresistive sensor of claim 8, wherein each strip has two parallel edges extending along the longitudinal extent of said strip, the shape of said edges having the same continuously varying function.

10. The magnetoresistive sensor of claim 9, wherein said continuously varying function is a periodic function.

11. The magnetoresistive sensor of claim 10, wherein said periodic function has a period length greater than a width said strip.

12. The magnetoresistive sensor of claim 11, wherein said periodic function is a sine function.

13. The magnetoresistive sensor of claim 11, wherein said periodic function comprises a sequence of circular arcs having alternating curvatures.

14. The magnetoresistive sensor of claim 11, wherein said periodic function comprises a sequence of sums of second and fourth order parabolae having alternate curvatures.

15. The magnetoresistive sensor of claim 11, wherein the amplitude of said periodic function provides a bridge output voltage having a low harmonic content, said periodic function providing an output voltage having a high amplitude when said magnetic field is moved with respect to said sensor.

16. The magnetoresistive sensor of claim 1, wherein the magnetoresistive strips are bounded by straight edges and have a constant width, said sensor further comprising a plurality of spaced-apart conductive layer strips having a length that is substantially equal to the width of the magnetoresistive strips, with a longitudinal direction of said conductive layer strips forming different intermediate angles along and with the longitudinal direction of said magnetoresistive strips.

17. The magnetoresistive sensor of claim 16, wherein said intermediate angles are chosen such that the direction of the current flowing through each magnetoresistive strip along the longitudinal direction of said magnetoresistive strip follows a sine function.

18. The magnetoresistive sensor of claim 17, wherein said intermediate angles are chosen such that the direction of the current flowing through each magnetoresistive strip along the longitudinal direction of said magnetoresistive strip follows a sequence of sums of second and fourth order parabolae having alternating curvatures.

19. The sensor of claim 1 wherein said at least two bridges are adapted to produce respective phase-shifted periodic signals in response to rotary movement of the magnetic field.

20. The sensor of claim 19 wherein said at least two bridges that produce respective phase-shifted periodic signals are half bridges.

21. The sensor of claim 19 wherein said at least two bridges that produce respective phase-shifted periodic signals are full bridges.

22. The sensor of claim 1 wherein said at least two bridges are adapted to produce respective phase-shifted periodic signals in response to linear movement of the magnetic field.

23. A magnetoresistive sensor for determining an alignment of said sensor relative to a magnetic field, said magnetic field being movable with respect to said sensor and periodic in a direction of movement, said sensor comprising:
at least two bridges comprising resistive strips made of magnetoresistive materials exhibiting a gigantic magnetoresistive (GMR) effect and having a first component with a magnetization direction that changes in response to the movement of the magnetic field and a second component with a magnetization direction that is independent of the magnetic field and varies continuously along a longitudinal extent of the strip, with the resistance value of each strip being determined by a resistance-determining angle enclosed between the magnetization direction of the first component and the magnetization direction of the second component.

24. The magnetoresistive sensor of claim 23, wherein the magnetization direction of said second component is adapted to be adjusted by a combination of the magnetic field produced by the current in said strips and an externally applied homogeneous magnetic field.

25. The sensor of claim 23, wherein at each of the ends of a strip the fixed magnetization encloses an angle of identical magnitude with a longitudinal direction of the strip.

26. The magnetoresistive sensor of claim 25, wherein the angle of the fixed magnetization varies symmetrically with respect to the center of said strip along the longitudinal extent of the strip.

27. The magnetoresistive sensor of claim 25, wherein the angle of the fixed magnetization varies periodically along the longitudinal extent of the strip.

28. The magnetoresistive sensor of claim 23, wherein opposing strip edges are defined by identical functions that vary continuously along the longitudinal extent of the strip, and wherein the magnetization direction of the second component is adjusted responsive to a current flowing through the strip so that the magnetization direction of the second component is always at right angles to the opposing strip edges.

29. The magnetoresistive sensor of claim 28, wherein said continuously varying function comprises a sine function.

30. The magnetoresistive sensor of claim 28, wherein said continuously varying function comprises a sequence of circular arcs having alternate curvatures.

31. The magnetoresistive sensor of claim 28, wherein said continuously varying function comprises a periodic function comprising a sequence of sums of second and fourth order parabolae having alternate curvatures.

32. The magnetoresistive sensor of claim 23, wherein the bridges comprise at least two full or half bridges, said strips comprising a material having an GMR effect such that an offset angle inside each half bridge is 180°, and an offset angle between corresponding resistors in two half or full bridges is 90°.

* * * * *